United States Patent [19]

Ostermiller

[11] 4,163,545
[45] Aug. 7, 1979

[54] CATTLE GUARD

[76] Inventor: Joseph Ostermiller, Goulding Creek Route, Roundup, Mont. 59072

[21] Appl. No.: 764,462

[22] Filed: Jan. 31, 1977

[51] Int. Cl.² .................. A01K 3/00; E01B 17/00
[52] U.S. Cl. .................................................. 256/17
[58] Field of Search ................ 119/28; 256/14, 17

[56] References Cited
U.S. PATENT DOCUMENTS

| 1,136,158 | 4/1915 | Morse et al. | 256/17 |
| 2,052,851 | 9/1936 | Snipes | 256/14 X |
| 2,750,157 | 6/1956 | Van Alsburg | 256/17 |
| 2,950,091 | 8/1960 | Arrington | 256/17 |

*Primary Examiner*—Hugh R. Chamblee
*Attorney, Agent, or Firm*—Clarence A. O'Brien; Harvey B. Jacobson

[57] ABSTRACT

A cattle guard having a plurality of substantially parallel, longitudinally extending rails arranged on and transversely of a plurality of substantially parallel, longitudinally extending support beams. The rails are prevented from rocking on the support beams by wedge elements disposed between the rails for stabilizing the rails on the support beams.

6 Claims, 7 Drawing Figures

CATTLE GUARD

BACKGROUND OF THE INVENTION

1. Field of the Invention

This invention relates generally to cattle guards, and particularly to a cattle guard which is easily assembled and disassembled so as to facilitate installation and maintenance of the guard.

2. Description of the Prior Art

U.S. Pat. Nos.: 1,125,095, issued Jan. 19, 1915, to W. J. Hickey; 2,938,711, issued May 31, 1960, to E. T. Luff; and 3,283,745, issued Nov. 8, 1966, to F. Vittetoe disclose examples of cattle guards wherein a plurality of rails are arranged across a plurality of substantially parallel supports. Of these known livestock or cattle guards which prevent livestock from passing through gaps in a fence, and the like, those disclosed in U.S. Pat. Nos.: 1,125,095 and 2,938,711 employ various brackets and fasteners for anchoring the rails to the associated supports.

The arrangement set forth in U.S. Pat. No. 3,283,745, on the other hand, uses generally triangular shaped rails disposed in similarly shaped notches provided on the supports such that the rails may rock relative to their associated supports and cause waste material to be shaken from the rails so as not to create a hazard for the livestock. In other words, the arrangement set forth in U.S. Pat. No. 3,283,745 is actually a slatted flooring for livestock, and not actually a guard. The difference is that the slats in flooring are spaced close enough together to permit the hooves of an animal to tread on the rails or slats without falling through, while the rails in a cattle guard are spaced such that the hooves of the animal will necessarily fall between the rails and thus discourage the animal from passing across the guard.

U.S. Pat. No. 3,228,376, issued Jan. 11, 1966, to W. J. Conover, discloses a slatted flooring of different construction than, but serving a similar purpose as, the flooring disclosed in the aforementioned U.S. Pat. No. 3,283,745, while other examples of cattle guards can be found in U.S. Pat. Nos.: 1,345,145, issued June 29, 1920, to J. I. Dominguez; 1,704,085, issued Mar. 5, 1929, to J. H. Holmgreen; and 2,672,123, issued Mar. 16, 1954, to E. J. Berscheit.

SUMMARY OF THE INVENTION

It is an object of the present invention to provide a cattle guard which can be completely assembled and disassembled without the use of fasteners, brackets, and the like.

It is another object of the present invention to provide a cattle guard which can be assembled, installed, and disassembled without need of heavy equipment, and the like.

It is yet another object of the present invention to provide a cattle guard which permits the cleaning of debris and other foreign matter from beneath the cattle guard in an easy manner by a single person.

These and other objects are achieved according to the present invention by providing a cattle guard having: a plurality of spaced, substantially parallel support beams; a plurality of spaced, substantially parallel rails arranged transversely of and resting on the support beams for being supported by the support beams; and wedge elements disposed between the rails for stabilizing the rails on the support beams.

The support beams advantageously are each provided with a plurality of side-by-side coextensive notches arranged for receiving the rails so as to prevent movement of the rails longitudinally of the support beams. Each of the rails is a longitudinally extending member substantially in the form of a frustum of a rectangular pyramid, and includes longitudinally extending side walls converging toward one another and away from a base portion of the rail. This base portion of the rail is inserted into a respective one of the notches provided in each of the support beams for keying the rail to the beams.

Each of the wedge elements is in the shape of an obelisk arranged in inverted orientation for wedging against the converging side walls of the rails and preventing rocking movement of the rails relative to the supporting beams. The extent of each of the wedge elements is much less than the longitudinal extent of the rails, such that a plurality of wedge elements is arrangeable in parallel relation along the longitudinal extent of an adjacent pair of the rails.

The support beams advantageously are disposed in a pit formed in earth, and the like, and slabs of appropriate configuration are preferably disposed between adjacent ones of the support beams at end portions of the beams for retaining earth from passing between the beams and filling the portion of the pit directly beneath the median portion of the rails.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
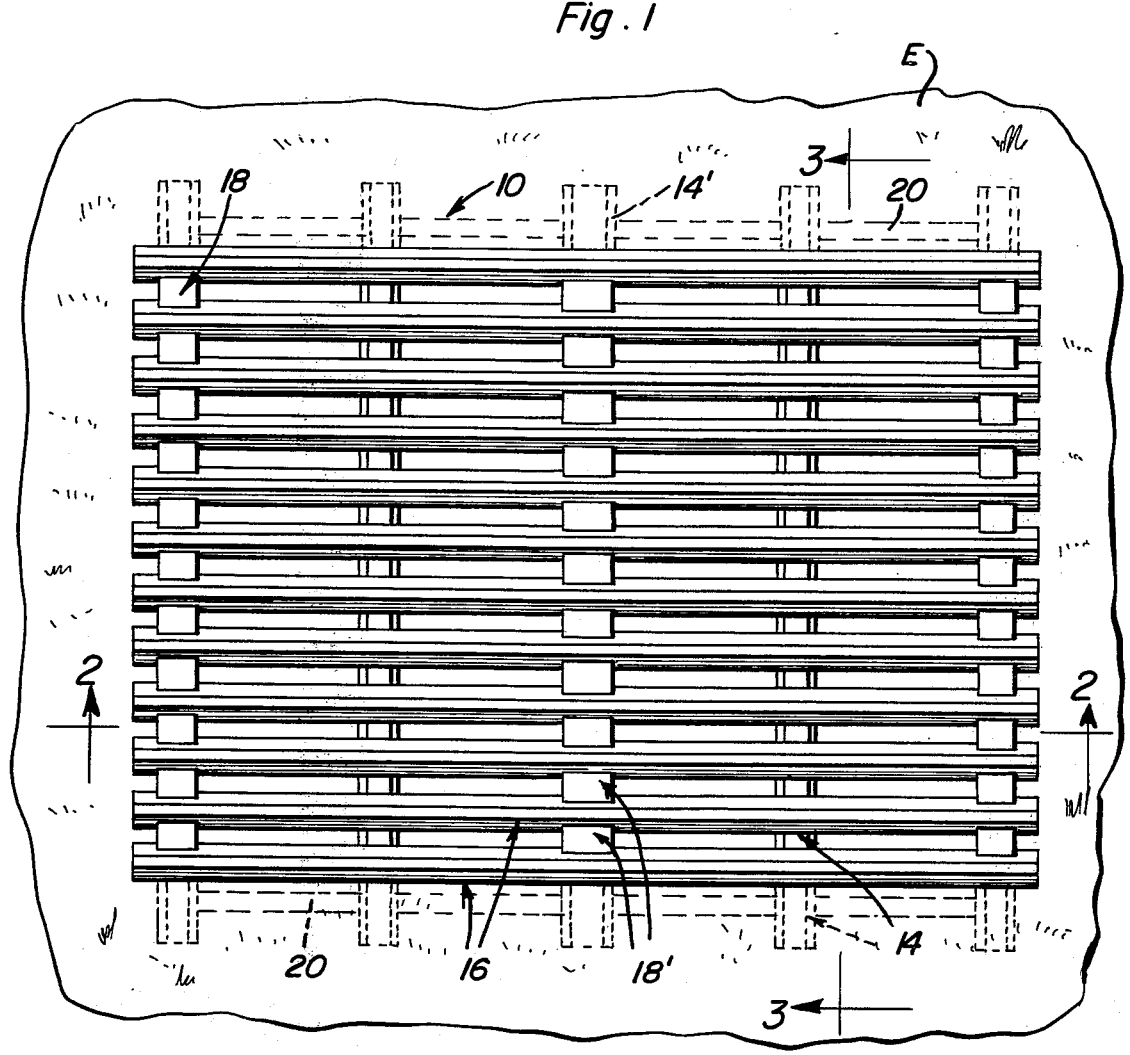
FIG. 1 is a schematic, top plan view showing a cattle guard according to the present invention.
Figure 2:
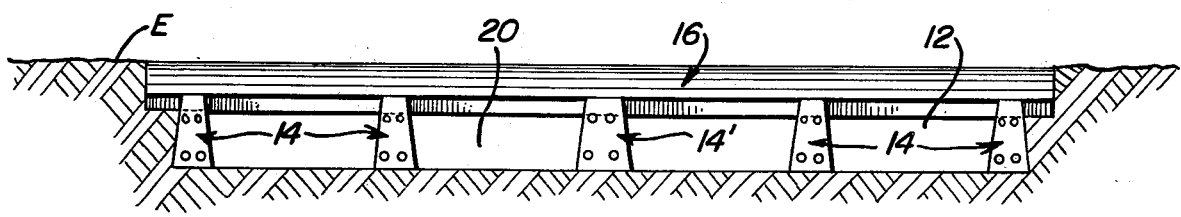
FIG. 2 is a schematic, sectional view taken generally along the line 2—2 of FIG. 1.
Figure 3:
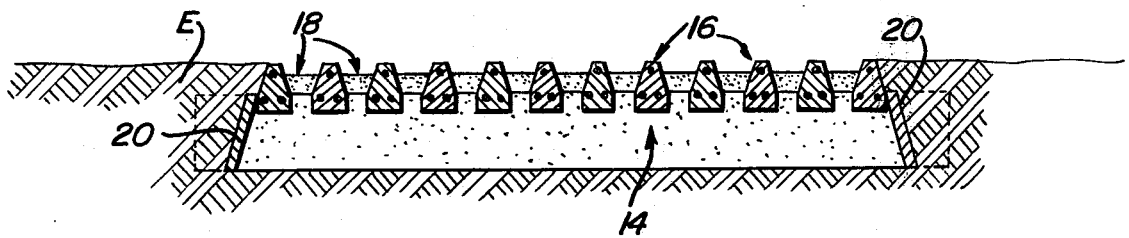
FIG. 3 is a schematic, sectional view taken generally along the line 3—3 of FIG. 1.

Referring now more particularly to FIGS. 1 through 3 of the drawings, a cattle guard 10 according to the present invention is shown as arranged in a pit 12 formed in a piece of ground or earth E. Forming cattle guard 10 are a plurality of support beams, with the end beams being designated by the reference numeral 14 and the central beam, which is slightly larger than the end beams 14, being designated by the reference numeral 14'. As can be seen, the beams 14, 14' are arranged substantially parallel to one another, and support a plurality of rails 16 arranged transversely of and supported by beams 14, 14'. It will be appreciated that the number of beams 14, 14' and rails 16 can vary, although there should be at least one central support beam 14' and two flanking end support beams 14. Wedge elements 18 are disposed between rails 16 for stabilizing rails 16 on support beams 14 in a manner which will become clear below.

Slabs 20 of appropriate configuration are arranged between end portions of support beams 14 and 14' in order to retain earth E at the end portions of beams 14, 14' and prevent the soil from moving into the central portion of pit 12 so as to fill in the area beneath the rails 16 and render the cattle guard 10 ineffective.

Figure 4:
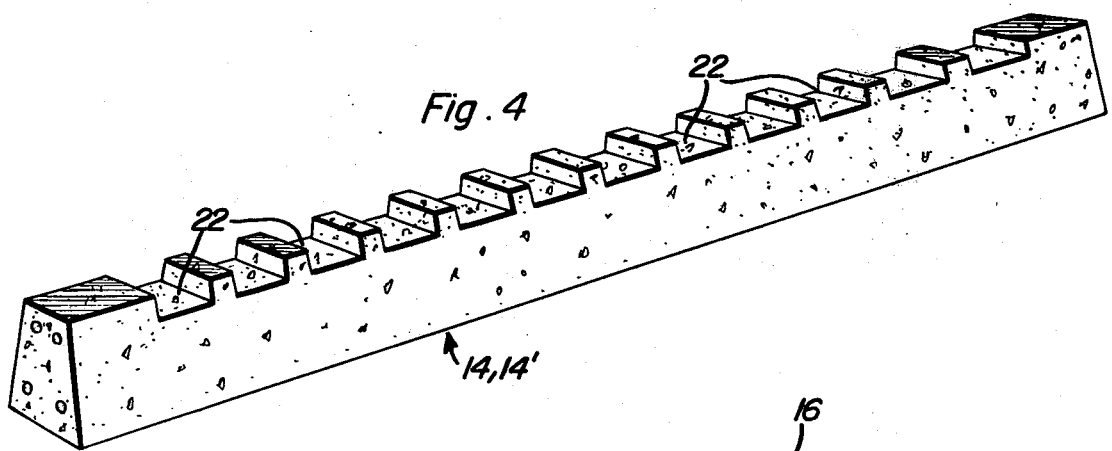
FIG. 4 is an enlarged, perspective view showing one of the support beams of a cattle guard according to the present invention.

As can best be seen from FIG. 4 of the drawings, the support beams 14, 14' are each provided with a plurality of side-by-side coextensive notches 22 arranged for receiving rails 16.

Figure 5:
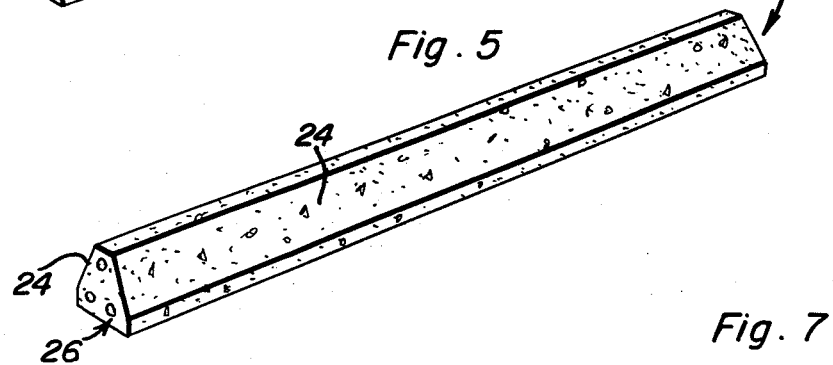
FIG. 5 is an enlarged, perspective view showing one of the rails of a cattle guard according to the present invention.
Figure 6:
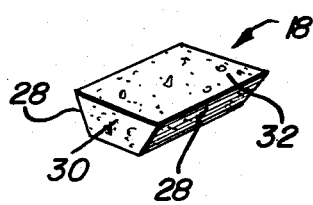
FIG. 6 is an enlarged, perspective view showing one of the wedge elements of a cattle guard according to the present invention.

A typical rail 16 is illustrated in FIG. 5 of the drawings, and can be seen as being a longitudinally extending member substantially in the form of a frustum of a rectangular pyramid which includes longitudinally extending side walls 24 converging toward one another and away from a base portion 26 of the rails 16. This base portion 26 is configured so as to mate with associated notches 22 provided in the support beams 14, 14'. By the arrangement of the base portion 26 of each rail 16 resting in associated ones of the notches 22, it will be appreciated that the rails 16 are prevented from shifting along the longitudinal extent of the beams 14, 14'.

Figure 7:
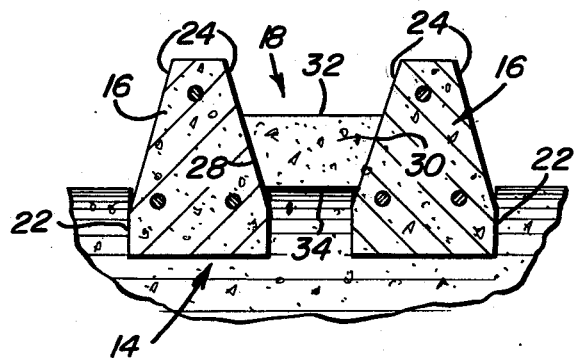
FIG. 7 is an enlarged, fragmentary, sectional view showing a detail of the central portion of FIG. 3.

Wedge elements 18 each are in the shape of an obelisk having converging side walls 28 and converging end walls 30, and arranged in inverted orientation with the larger base 32 arranged above the smaller base 34 for wedging the end walls 30 against the converging side walls 24 of rails 16 and preventing rocking movement of the rails. See FIG. 7. By this arrangement, it will be appreciated that cattle guard 10 can be disassembled in a simple manner merely by pulling wedge elements 18 out of contact with side walls 24 of rails 16, thus freeing rails 16 for removal as desired. Each of the wedge elements 18 is illustrated as of an extent much less than the longitudinal extent of rail 16 with a plurality of wedge elements 18 being arranged in parallel along the longitudinal extent of a pair of adjacent rails 16. Preferably, the width of the wedge elements 18 is substantially the same as that of the support beams 14, 14', with the wedge elements associated with the central support beam 14' being designated 18' in the drawings. In this manner, the bearing or pressure surfaces of the wedge elements 18, 18' against the associated rails 16 is substantially the same as the bearing or pressure surfaces exerted on the base portions 26 of the rails 16 by the support beams 14, 14'. Further, as can be seen from FIG. 1, wedge elements 18 need not be used in conjunction with all of the end support beams 14 used in a particular cattle guard construction.

As can be understood from the above description of the drawings, a cattle guard constructed according to the present invention provides a simple, yet rugged and reliable, structure for preventing cattle from crossing a gap in a fence, and the like. The guard is easily installed and disassembled, and the latter contributes to the ability of a single person to partially disassemble the guard as desired to clean the interior of pit 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A cattle guard, comprising, in combination:
   (a) a plurality of spaced, coextensive, substantially parallel support beams;
   (b) a plurality of rails arranged transversely of, anchored on, and supported by the support beams, each of the rails being substantially in the form of a longitudinally extending frustum of a rectangular pyramid including longitudinally extending side walls converging toward one another and away from the support beams; and
   (c) wedge means disposed btween the rails for stabilizing the rails on the support beams, the wedge means including a plurality of wedge elements each a single piece separate from the rails and in the shape of an obelisk removably arranged in inverted orientation for wedging against the converging side walls of adjacent ones of the rails and preventing rocking movement of the rails relative to the support beams.

2. A structure as defined in claim 1, wherein the support beams are each provided with a plurality of side-by-side coextensive notches arranged for receiving the rails, the rails resting in the notches.

3. A structure as defined in claim 1, wherein each of the wedge elements is of an extent much less than the longitudinal extent of the rails with a plurality of wedge elements being arranged in parallel relation along the longitudinal extent of a pair of adjacent rails.

4. A structure as defined in claim 3, wherein the support beams are each provided with a plurality of side-by-side coextensive notches arranged for receiving the rails, the rails resting in the notches.

5. A structure as defined in claim 4, wherein the support beams have longitudinally spaced end portions and are disposed in a pit formed in a piece of earth, and further including earth supporting slabs arranged between the support beams adjacent the end portions thereof for retaining earth from passing between the end portions of the beams into the interior of the pit.

6. A structure as defined in claim 1, wherein the support beams have longitudinally spaced end portions and are disposed in a pit formed in a piece of earch, and further including earth support slabs arranged between the support beams adjacent the end portions thereof for retaining earth from passing between the end portions of the beams into the interior of the pit.

* * * * *